US012769609B2

(12) United States Patent
Naruboina et al.

(10) Patent No.: US 12,769,609 B2
(45) Date of Patent: Oct. 20, 2026

(54) DATA PROCESSING SYSTEM PERIPHERAL DEVICE MANAGEMENT AND RECOVERY

(71) Applicant: Dell Products L.P., Round Rock, TX (US)

(72) Inventors: Guru Prasad Yadav Naruboina, Bangalore (IN); Kalyani Korubilli, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 18/785,407

(22) Filed: Jul. 26, 2024

(65) Prior Publication Data

US 2026/0030091 A1 Jan. 29, 2026

(51) Int. Cl.
*G06F 11/07* (2006.01)

(52) U.S. Cl.
CPC ...... *G06F 11/0793* (2013.01); *G06F 11/0772* (2013.01)

(58) Field of Classification Search
CPC ......................... G06F 11/0793; G06F 11/0772
USPC ........................................................ 714/48
See application file for complete search history.

(56) References Cited

U.S. PATENT DOCUMENTS

| | | | |
|---|---|---|---|
| 5,339,404 | A | 8/1994 | Vandling, III |
| 5,740,429 | A | 4/1998 | Wang |
| 7,024,567 | B2 | 4/2006 | Kim |
| 7,418,545 | B2 | 8/2008 | Marushak |
| 7,865,775 | B2 | 1/2011 | Yao |
| 7,974,286 | B2 | 7/2011 | Keohane et al. |
| 8,817,000 | B1 | 8/2014 | Sauvage |
| 9,804,646 | B2 | 10/2017 | Jaussi |
| 10,416,988 | B1 | 9/2019 | Kulchytskyy |
| 2002/0095611 | A1 | 7/2002 | Jochiong |
| 2003/0182577 | A1 | 9/2003 | Mocek |
| 2008/0059720 | A1 | 3/2008 | Rothman |
| 2008/0162952 | A1 | 7/2008 | Landers |
| 2009/0132838 | A1 | 5/2009 | Cherian |
| 2010/0007473 | A1 | 1/2010 | Fadell |
| 2011/0035526 | A1 | 2/2011 | Slaight |
| 2011/0119686 | A1 | 5/2011 | Chen |
| 2014/0195684 | A1 | 7/2014 | Taaghol |
| 2014/0258526 | A1 | 9/2014 | Le Sant |
| 2015/0287273 | A1 | 10/2015 | Panzarella |
| 2015/0304343 | A1 | 10/2015 | Cabrera |
| 2015/0309559 | A1 | 10/2015 | Jacobson |

(Continued)

OTHER PUBLICATIONS

Wikipedia "IPMI" pages retrieved from https://en.wikipedia.org/wiki/Intelligent_Platform_Management_Interface (Year: 2026).*

(Continued)

*Primary Examiner* — Yair Leibovich
(74) *Attorney, Agent, or Firm* — WOMBLE BOND DICKINSON (US) LLP

(57) ABSTRACT

Methods and systems for managing a data processing system are disclosed. Uncorrected errors of a data processing system may be resolved by a management controller of the data processing system. The management controller may independently identify one or more peripheral devices of the data processing system associated with the uncorrected errors and cause the identified ones of the peripheral devices to be rebooted without rebooting an entirety of the data processing system.

20 Claims, 9 Drawing Sheets

(56) References Cited

U.S. PATENT DOCUMENTS

| | | | | |
|---|---|---|---|---|
| 2018/0011524 | A1 | 1/2018 | Stumpf | |
| 2018/0062395 | A1 | 3/2018 | Aldehayyat | |
| 2020/0044868 | A1 | 2/2020 | Vakulenko | |
| 2020/0097379 | A1 | 3/2020 | Truong | |
| 2020/0218527 | A1* | 7/2020 | Ganesan | G06F 8/65 |
| 2020/0249736 | A1 | 8/2020 | Walker | |
| 2020/0257517 | A1 | 8/2020 | Seater | |
| 2021/0042062 | A1 | 2/2021 | Betusno | |
| 2023/0008238 | A1 | 1/2023 | Mugunda | |
| 2023/0016507 | A1 | 1/2023 | Kodama | |
| 2023/0205248 | A1 | 6/2023 | Srivastav | |
| 2023/0315485 | A1 | 10/2023 | Paulraj | |
| 2023/0376575 | A1 | 11/2023 | Anzai | |
| 2024/0054039 | A1 | 2/2024 | Srinivasan | |
| 2024/0214279 | A1* | 6/2024 | Adiletta | H04L 41/16 |
| 2024/0393858 | A1 | 11/2024 | Dai | |

OTHER PUBLICATIONS

Wikipedia "ACPI" pages retrieved from https://en.wikipedia.org/wiki/ACPI (Year: 2026).*

Cycuity, "Detect and Prevent Security Vulnerabilities in your Hardware Root of Trust," 2022. Web Page <https://cycuity.com/wp-content/uploads/2022/06/Cycuity_White-Paper_Detect-Security-Vulnerabilities-HROT.pdf> accessed on Jul. 23, 2024 (17 Pages).

Elmaghbub, Abdurrahman, et al., "Domain-Agnostic Hardware Fingerprinting-Based Device Identifier for Zero-Trust IoT Security," IEEE Wireless Communications 31.2 (2024) (7 Pages).

Rostami, Mohamadreza, et al. "Beyond random inputs: A novel ml-based hardware fuzzing." 2024 Design, Automation & Test in Europe Conference & Exhibition. IEEE. (2024) (6 Pages).

Gaikwad, Pravin, et al. "Third-party hardware IP assurance against Trojans through supervised learning and post-processing." arXiv preprint arXiv:2111.14956. IEEE. (2021) (13 Pages).

* cited by examiner

DATA PROCESSING SYSTEM PERIPHERAL DEVICE MANAGEMENT AND RECOVERY

FIELD

Embodiments disclosed herein relate generally to data processing system management. More particularly, embodiments disclosed herein relate to systems and methods to manage and recover one or more peripheral devices installed within a data processing system.

BACKGROUND

Computing devices may provide computer implemented services. The computer implemented services may be used by users of the computing devices and/or devices operably connected to the computing devices. The computer implemented services may be performed with hardware components such as processors, memory modules, storage devices, and communication devices. The operation of these components and the components of other devices may impact the performance of the computer implemented services.

BRIEF DESCRIPTION OF THE DRAWINGS

Embodiments disclosed herein are illustrated by way of example and not limitation in the figures of the accompanying drawings in which like references indicate similar elements.

DETAILED DESCRIPTION

Various embodiments will be described with reference to details discussed below, and the accompanying drawings will illustrate the various embodiments. The following description and drawings are illustrative and are not to be construed as limiting. Numerous specific details are described to provide a thorough understanding of various embodiments. However, in certain instances, well-known or conventional details are not described in order to provide a concise discussion of embodiments disclosed herein.

Reference in the specification to "one embodiment" or "an embodiment" means that a particular feature, structure, or characteristic described in conjunction with the embodiment can be included in at least one embodiment. The appearances of the phrases "in one embodiment" and "an embodiment" in various places in the specification do not necessarily all refer to the same embodiment.

References to an "operable connection" or "operably connected" means that a particular device is able to communicate with one or more other devices. The devices themselves may be directly connected to one another or may be indirectly connected to one another through any number of intermediary devices, such as in a network topology.

Figure 4:
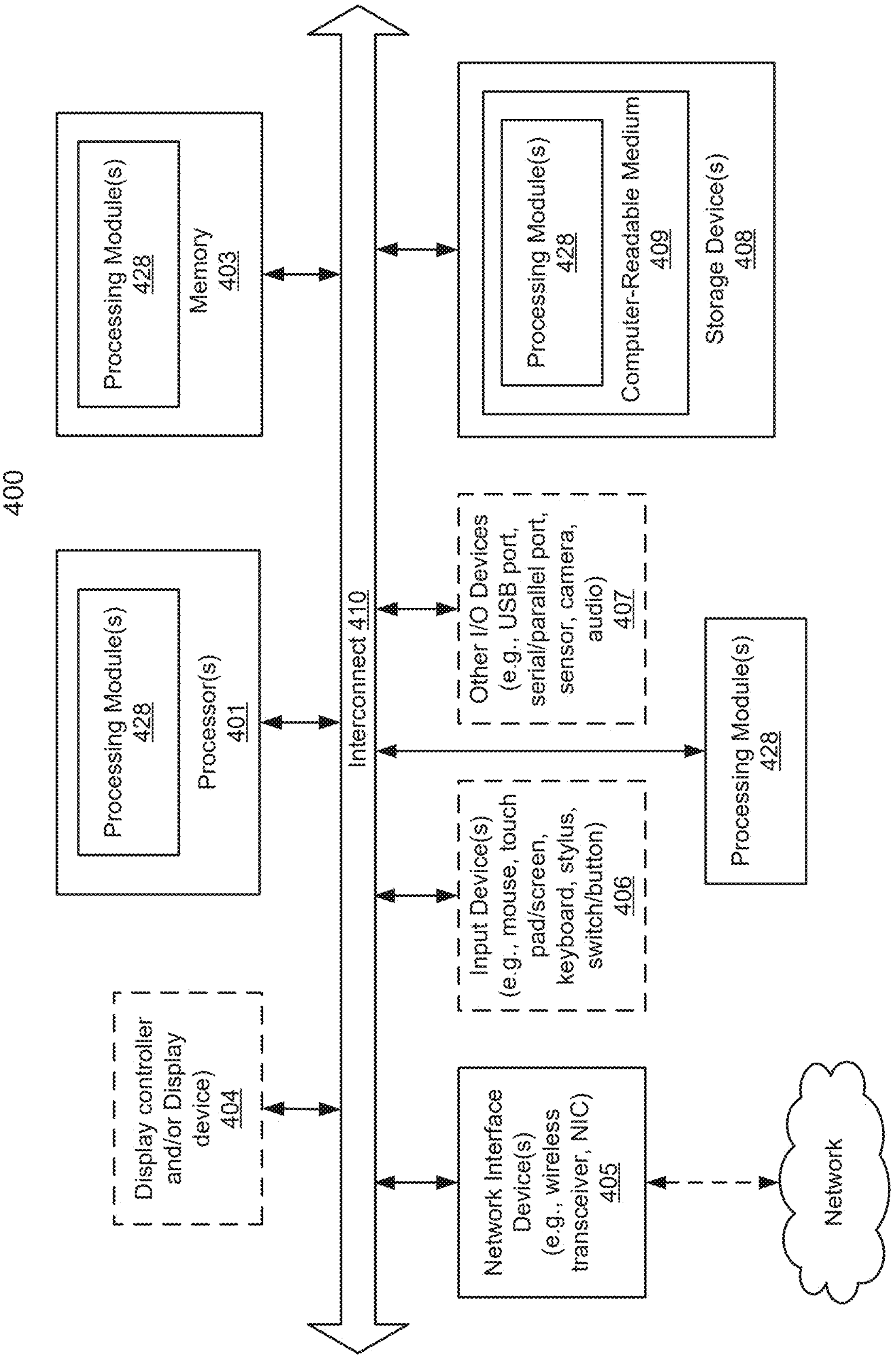
FIG. 4 shows a block diagram illustrating a computing device in accordance with one or more embodiments.

In general, embodiments disclosed herein relate to methods and systems for managing and recovering one or more peripheral devices installed within a data processing system (such as computing devices, as described below in reference to FIG. 4). Peripheral devices may include add-on and/or expansion components (namely, hardware components) such as channel cards (e.g., a fiber channel card, or the like), network interface cards (NICs), graphical processing units (GPU), data processing units (DPUs), digital signal processors (DSPs), or the like.

These peripheral devices may include one or more processors that are separate and operate independently of a main processor (e.g., the central processing unit (CPU) and the motherboard on which the CPU is installed) of the data processing system. These peripheral devices may also be configured to provide additional and/or extended services (e.g., conducting workloads offloaded to these peripheral devices by the CPU, or the like) and additional and/or extended computing resources (e.g., additional memory space, processing capability/powers, or the like) that benefit and enhance the data processing system.

However, when errors occur on these peripheral devices (e.g., hardware errors when these peripheral device breakdown, software related errors, or the like), the data processing system hosting (e.g., in which these peripheral devices are installed) may need to be rebooted in order for these errors to be remediated. Such rebooting of the data processing system may lead to undesired system down time during the recovery process of these peripheral devices.

Furthermore, in environments where multiple data processing systems work together (e.g., such as a deployment making a server farm, a radio access network (RAN) architecture and/or environment, or the like), system down time of one data processing system may cause issues for other data processing systems within the same environment, resulting in disruptions to and/or failure of other functions and performances of the other data processing systems within the environment.

Figure 1A:
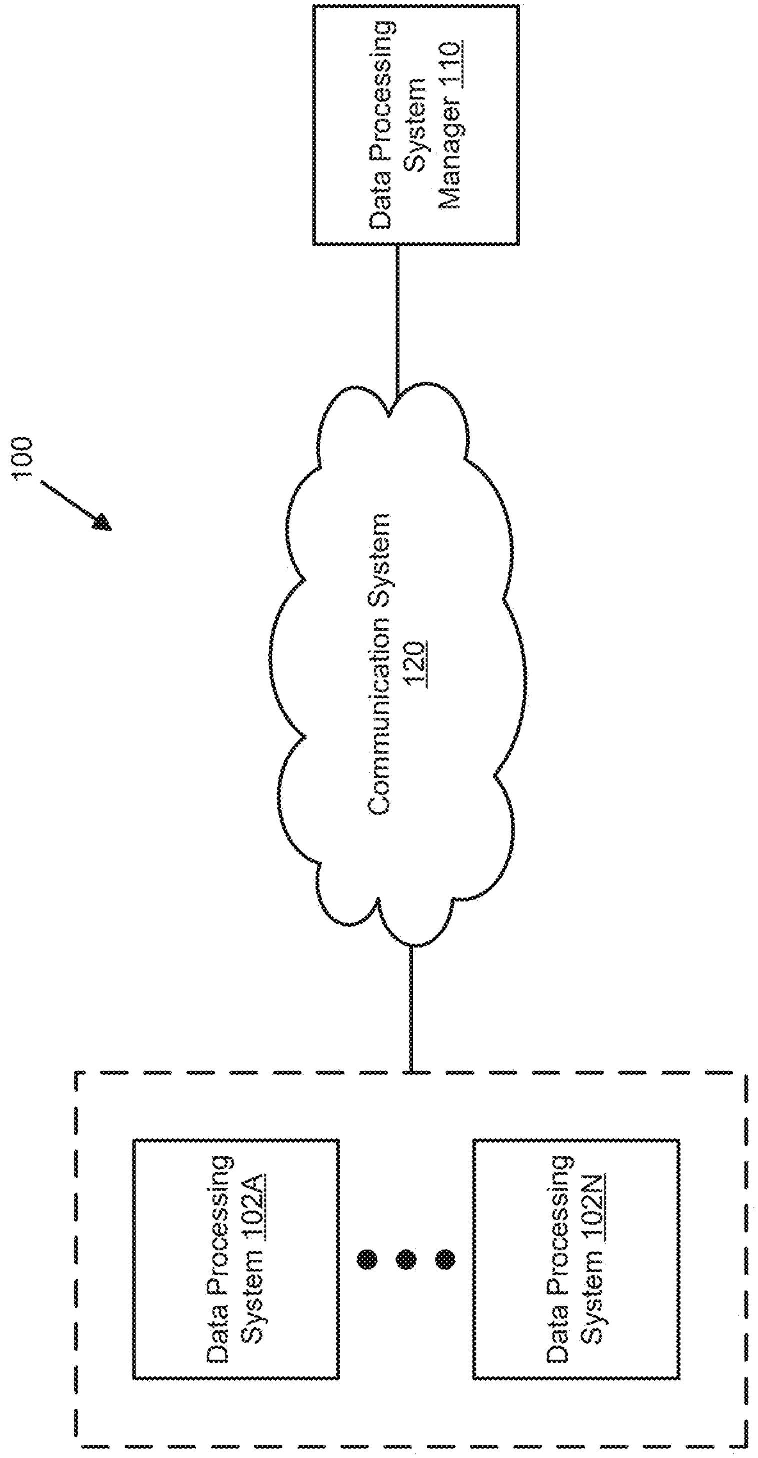
FIG. 1A shows a block diagram illustrating a system in accordance with one or more embodiments.
Figure 1B:
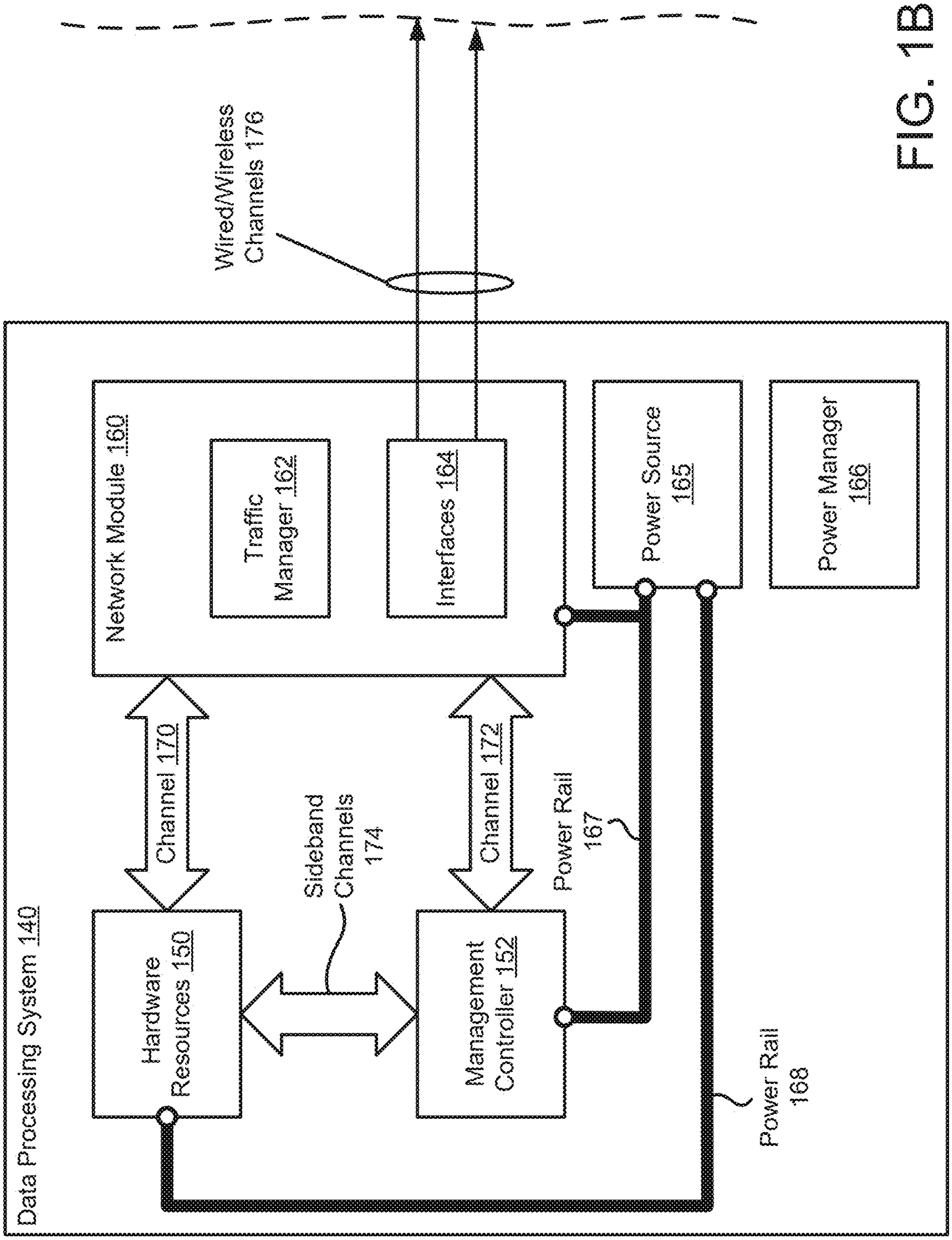
FIGS. 1B and 1C show a block diagram illustrating a data processing system in accordance with one or more embodiments.
Figure 1C:
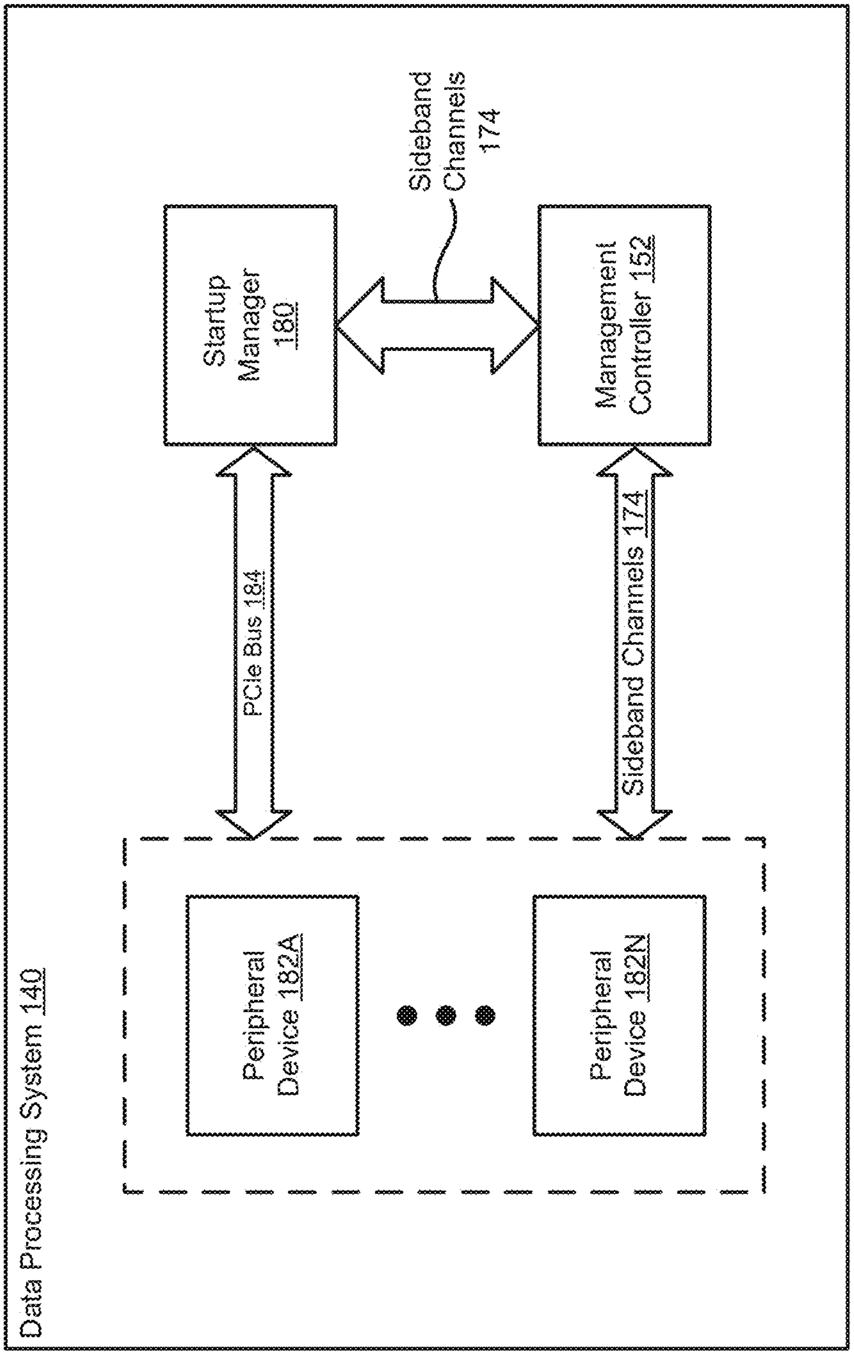
Figure 1D:
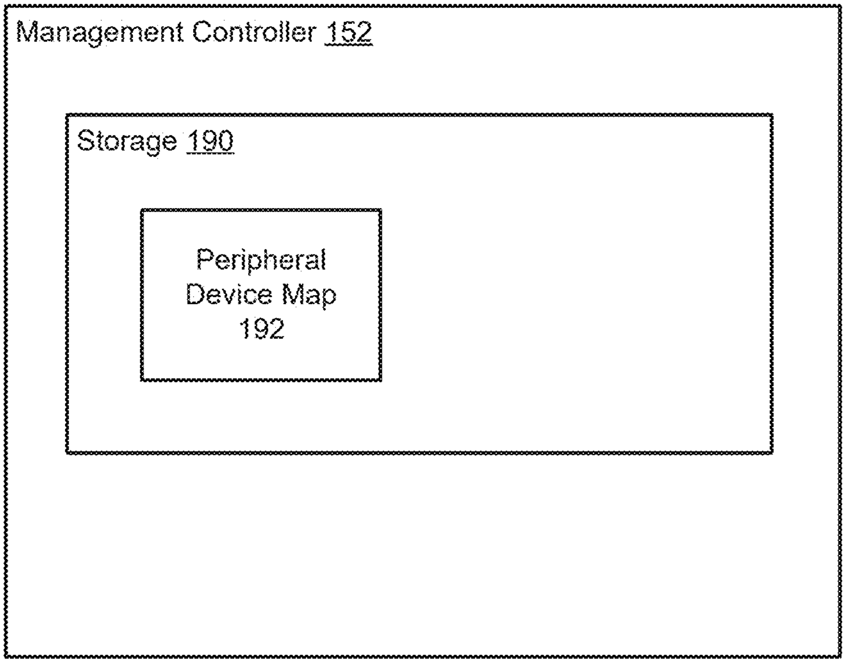
FIG. 1D shows a block diagram illustrating a management controller in accordance with one or more embodiments.

To resolve the above issues, a management controller (e.g., a baseboard management controller (BMC) in the form of a microcontroller, or the like as discussed in more detail before in reference to FIGS. 1B and 1D), may be provided manage the functionalities and recovery of any peripheral devices that are experiencing one or more errors. The management controller may be installed within the data processing system but communicate with the peripheral devices using a different (e.g., separate) communication channel from a communication channel used by the data processing's CPU to communicate with the peripheral devices. The management controller may also be configured with its own limited computing resources that are separate and independent of the limited computing resources of the data processing system's CPU.

The management controller may also include a peripheral device map that includes information on the location (e.g., physical connection/interface/port location, or the like) and configuration details of each peripheral device hosted by (e.g., installed internally within or connected externally to) the data processing system.

Using the peripheral device map and the separate communication channel, the management controller may advantageously not only be able to determine which peripheral devices are experiencing and/or causing errors but also separately issue reboot/recovery instructions to these peripheral devices to cause only the peripheral devices to be rebooted and/or restarted without rebooting and/or restarting the entire data processing system.

Thus, embodiments disclosed herein may provide, among others an improvement (e.g., a technical improvement) to the above-discussed issues. In particular, by only rebooting and/or restarting the peripheral devices that are experiencing and/or causing errors without rebooting and/or restarting the entire data processing system, system down time of the data processing system can be avoided. In particular, the data processing system may still use its CPU (which is still operating normally) to execute and implement processes that do not require the use of the peripheral devices that are experiencing and/or causing errors. Further, any errors experienced by the data processing system that are caused by a faulty peripheral device may be resolved and cleared when the faulty peripheral device is rebooted and/or restarted by the management controller.

Such reduction of the data processing system's system downtime not only advantageously improves the data processing system's own functionalities (e.g., through the prevention of disruptions to and/or failure of other functions and performances of the data processing system) but also similarly improves the functionalities of other data processing systems within a same operating environment of the data processing system (e.g., through the prevention of disruptions to and/or failure of other functions and performances of the other data processing systems within the environment caused by the data processing system experiencing the system down time).

Further, by offloading the management and recovery of the peripheral devices to the management controller, limited computing resources of the data processing system's CPU that would otherwise be used to manage and recover these peripheral devices may be saved for performing other essential features and/or for fulfilling user requested processes; thus, further improving the functionalities (e.g., computing functionalities) of the data processing system. Said another way, essential and/or user requested processes that would otherwise have been disrupted because the limited computing resources of the data processing system's main CPU have to be redirected to recovery of peripheral devices can continue to be implemented/executed by the data processing system's main CPU seamlessly while the peripheral devices are being recovered using the separate computing resources of the management controller.

In an embodiment, a method for managing a data processing system is provided. The method may include: obtaining, by a management controller of the data processing system, system error data indicating that the data processing system is experiencing an uncorrected error; determining, by the management controller, that a peripheral device installed in the data processing system that is a source of the uncorrected error, the determination being made using the system error data and a peripheral device map stored in the management controller; and causing, by the management controller, a restart of only the peripheral device without restarting an entirety of the data processing system to remediate the uncorrected error.

The management controller is a microcontroller installed within the data processing system that operates independently of a central processing unit (CPU) of the data processing system, and the peripheral device is a data processing unit (DPU).

The peripheral device is a first peripheral device among a plurality of peripheral devices installed in the data processing system, and the plurality of peripheral devices are connected to the CPU via a first communication interface and to the management controller via a second communication interface different from the first communication interface.

The system error data is generated by the CPU of the data processing system during a system management interrupt (SMI) event, and the uncorrected error is an error that cannot be resolved without, at least, restarting the peripheral device for recovery.

The first communication interface is a Peripheral Component Interconnect Express (PCIe) bus, and the second communication interface comprises one or more sideband channels between the management controller and the plurality of peripheral devices.

The method may further include: obtaining, by the management controller, configuration data of the plurality of peripheral devices from a startup manager of the data processing system; and generating, by the management controller, the peripheral device map using the configuration data.

The startup manager is a Basic Input/Output System (BIOS) of the data processing system.

A non-transitory media may include instructions that when executed by a processor cause the computer-implemented method to be performed.

A data processing system may include the non-transitory media and a processor, and may perform the computer-implemented method when the processor executes the instructions in the non-transitory media.

Turning to FIG. 1A, a block diagram illustrating a system 100 in accordance with an embodiment is shown. The system 100 shown in FIG. 1A may provide computer implemented services. The computer implemented services may include any type and quantity of computer implemented services. For example, the computer implemented services may include data storage services, instant messaging services, database services, and/or any other type of service that may be implemented with a computing device.

To provide the computer implemented services, the system may include any number of data processing systems 102A-102N (e.g., organized in the form of a deployment or the like). Data processing systems 102A-102N may provide the computer implemented services to users of data processing systems 102A-102N and/or to other devices (not shown). Different data processing systems 102A-102N may provide similar and/or different computer implemented services.

To provide the computer implemented services, data processing systems 102A-102N may include various hardware components (e.g., processors, memory modules, storage devices, peripheral devices, etc.) and host various software components (e.g., operating systems, application, startup managers such as basic input-output systems, etc.). These hardware and software components (discussed in more detail below in FIGS. 1B-1D) may provide the computer implemented services via their operation.

The software components may be implemented using various types of services. For example, each data processing system of the data processing systems 102A-102N may host various services that provide the computer implemented service (e.g., application services) and/or that manage the operation of these services (e.g., management services). The aggregate (e.g., combination) of the management and application services may be a complete service that provide desired functionalities.

To manage the data processing systems 102A-102N, the system of FIG. 1A may include data processing system manager 110. Data processing system manager 110 may include various hardware components (e.g., processors, memory modules, storage devices, peripheral devices, etc.) and host various software components (e.g., operating systems, application, startup managers such as basic input-output systems, etc.). These hardware and software components may provide the functionalities (e.g., the communication with and management of the data processing systems) of the data processing system manager 110.

In one example, the data processing system manager 110 may be a computing device (e.g., computing device of FIG. 4) such as a desktop computer or server that is used by used by manufacturers (or distributors, administrators, etc.) of one or more components installed within the data processing systems 102A-102N to communicate with and manage (namely, the components installed within) the data processing systems 102A-102N.

Any of the components illustrated in FIG. 1A may be operably connected to each other (and/or components not illustrated) with communication system 120. In an embodiment, communication system 120 includes one or more networks that facilitate communication between any number of components. The networks may include wired networks and/or wireless networks (e.g., and/or the Internet). The networks may operate in accordance with any number and types of communication protocols (e.g., such as the Internet Protocol).

While FIG. 1A is illustrated as including a limited number of specific components, a system in accordance with an embodiment may include fewer, additional, and/or different components than those illustrated therein.

Turning to FIG. 1B, a diagram illustrating data processing system 140 in accordance with an embodiment is shown. Data processing system 140 may be similar to any of the data processing systems (e.g., any one of data processing systems 102A-102N) shown in FIG. 1A.

To provide computer implemented services, data processing system 140 may include any quantity of hardware resources 150. Hardware resources 150 may be in-band hardware components, and may include a processor operably coupled to memory, storage, and/or other hardware components. These hardware resources 150 (in addition to network module 160, management controller 152, power source 165, power manager 166, and the other components shown in FIG. 1B) may be the default hardware components that are included in the data processing system 140 by a manufacturer of the data processing systems 140. However, it could be appreciated that the default hardware components may include more (or less) of what is shown in FIG. 1B.

The processor (e.g., a central processing unit (CPU) installed on a motherboard, or the like) may host various management entities such as operating systems, drivers, network stacks, and/or other software entities that provide various management functionalities. For example, the operating system and drivers may provide abstracted access to various hardware resources. Likewise, the network stack may facilitate packaging, transmission, routing, and/or other functions with respect to exchanging data with other devices.

For example, the network stack may support transmission control protocol/internet protocol communication (TCP/IP) (e.g., the Internet protocol suite) thereby allowing the hardware resources 150 to communicate with other devices via packet switched networks and/or other types of communication networks.

The processor may also host various applications that provide the computer implemented services. The applications may utilize various services provided by the management entities and use (at least indirectly) the network stack to communication with other entities.

In embodiments, the processor (of the hardware resources 150) may be a main processor of the data processing system 140. The processor (of the hardware resources 150), may also be the main processor on which an operating system (OS) of the data processing system 140 is stored and runs.

In embodiments, use of the network stack and the services provided by the management entities may place the applications at risk of indirect compromise. For example, if any of these entities trusted by the applications are compromised, these entities may subsequently compromise the operation of the applications. For example, if various drivers and/or the communication stack are compromised, communications to/from other devices may be compromised. If the applications trust these communications, then the applications may also be compromised.

For example, to communicate with other entities, an application may generate and send communications to a network stack and/or driver, which may subsequently transmit a packaged form of the communication via channel 170 to a communication component, which may then send the packaged communication (in a yet further packaged form, in some embodiments, with various layers of encapsulation being added depending on the network environment outside of data processing system 140) to another device via any number of intermediate networks (e.g., via wired/wireless channels 176 that are part of the networks).

To reduce the likelihood of the applications and/or other in-band entities from being indirectly compromised, data processing system 140 may include management controller 152 and network module 160. Each of these components of data processing system 140 is discussed below.

Management controller 152 may be implemented, for example, using a system on a chip or other type of independently operating computing device (e.g., independent from the in-band components, such as hardware resources 150, of a data processing system 140). For example, management controller 152 may be a baseboard management controller (BMC), or the like.

Management controller 152 may provide various management functionalities for data processing system 140. For example, management controller 152 may monitor various ongoing processes performed by the in-band component, may manage power distribution, thermal management, and/or other functions of data processing system 140. To conduct such monitoring and provide such functions, the management controller 152 may include its own processor (e.g., a second processor separate and operating independently from the main processer of the data processing system).

Additionally, management controller 152 may be operably connected to various components via sideband channels 174 (in FIG. 1B, a limited number of sideband channels are included for illustrative purposes, it will be appreciated that management controller 152 may communication with other components (including peripheral devices installed within the data processing system 140) via any number of sideband channels). The sideband channels may be implemented using separate physical channels, and/or with a logical channel overlay over existing physical channels (e.g., logical division of in-band channels). The sideband channels may allow management controller 152 to interface with other components and implement various management functionalities such as, for example, general data retrieval (e.g., to snoop ongoing processes), telemetry data retrieval (e.g., to identify a health condition/other state of another component), function activation (e.g., sending instructions that cause the receiving component to perform various actions such as displaying data, adding data to memory, causing various processes to be performed), and/or other types of management functionalities.

For example, to reduce the likelihood of indirect compromise of an application hosted by hardware resources 150, management controller 152 may enable information from other devices to be provided to the application without traversing the network stack and/or management entities of hardware resources 150. To do so, the other devices may direct communications including the information to management controller 152. Management controller 152 may then, for example, send the information via sideband channels 174 to hardware resources 150 (e.g., to store it in a memory location accessible by the application, such as a shared memory location, a mailbox architecture, or other type of memory-based communication system) to provide it to the application. Thus, the application may receive and act on the information without the information passing through potentially compromised entities. Consequently, the information may be less likely to also be compromised, thereby reducing the possibility of the application becoming indirectly compromised. Similarly, processes may be used to facilitate outbound communications from the applications.

Management controller 152 may be operably connected to communication components of data processing system 140 via separate channels (e.g., 172) from the in-band components, and may implement or otherwise utilize a distinct and independent network stack (e.g., TCP/IP). Consequently, management controller 152 may communication with other devices independently of any of the in-band components (e.g., does not rely on any hosted software, hardware components, etc.). Accordingly, compromise of any of hardware resources 150 and hosted component may not result in indirect compromise of any management controller 152, and entities hosted by management controller 152.

To facilitate communication with other devices, data processing system 140 may include network module 160. Network module 160 may provide communication services for in-band components and out-of-band components (e.g., management controller 152) of data processing system. To do so, network module 160 may include traffic manager 162 and interfaces 164.

Traffic manager 162 may include functionality to (i) discriminate traffic directed to various network endpoints advertised by data processing system 140, and (ii) forward the traffic to/from the entities associated with the different network endpoints. For example, to facilitate communications with other devices, network module 160 may advertise different network endpoints (e.g., different media access control address/internet protocol addresses) for the in-band components and out-of-band components. Thus, other entities may address communications to these different network endpoints. When such communications are received by network module 160, traffic manager 162 may discriminate and direct the communications accordingly (e.g., over channel 170 or channel 172, in the example shown in FIG. 1B, it will be appreciated that network module 160 may discriminate traffic directed to any number of data units and direct it accordingly over any number of channels).

Accordingly, traffic directed to management controller 152 may never flow through any of the in-band components. Likewise, outbound traffic from the out-of-band component may never flow through the in-band components.

To support inbound and outbound traffic, network module 160 may include any number of interfaces 164. Interfaces 164 may be implemented using any number and type of communication devices which may each provide wired and/or wireless communication functionality. For example, interfaces 164 may include a wide area network card, a WiFi card, a wireless local area network card, a wired local area network card, an optical communication card, and/or other types of communication components. These components may support any number of wired/wireless channels 176.

Thus, from the perspective of an external device, the in-band components and out-of-band components of data processing system 140 may appear to be two independent network entities, that may independently addressable, and otherwise unrelated to one another.

To facilitate management of data processing system 140 over time, hardware resources 150, management controller 152 and/or network module 160 may be positioned in separately controllable power domains. By being positioned in these separately power domains, different subsets of these components may remain powered while other subsets are unpowered.

For example, management controller 152 and network module 160 may remain powered while hardware resources 150 is unpowered. Consequently, management controller 152 may remain able to communication with other devices even while hardware resources 150 are inactive. Similarly, management controller 152 may perform various actions while hardware resources 150 are not powered and/or are otherwise inoperable, unable to cooperatively perform various process, are compromised, and/or are unavailable for other reasons. Said another way, as long as the data processing system is connected to a power source (e.g., a batter, a wall outlet, a generator, or the like), management controller 152 may still be powered on and operational while the data processing system itself is in a powered off (e.g., shut down/shut off) state. More specifically, turning off the data processing system 140 (e.g., via a shut down command) does not also turn off the management controller 152. As a result, the management controller 152 may still perform processes (e.g., perform the processes, operations, steps, or the like of the data flow diagrams and flowcharts discussed below in reference to FIGS. 2A-3B) even while the data processing system 140 itself is in a powered off/shut off state.

To implement the separate power domains, data processing system 140 may include a power source (e.g., 165) that separately supplies power to power rails (e.g., 167, 168) that power the respective power domains. Power from the power source (e.g., one or more power supplies, batteries, or other types of PSUs etc.) may be selectively provided to the separate power rails to selectively power the different power domains. A power manager (e.g., 166) may manage power from power source 165 that is supplied to the power rails. Management controller 152 may cooperate with power manager 166 to manage supply of power to these power domains.

In FIG. 1B, an example implementation of separate power domains using power rails 167-168 is shown. The power rails may be implemented using, for example, bus bars or other types of transmission elements capable of distributing electrical power. While not shown, it will be appreciated that the power domains may include various power management components (e.g., fuses, switches, etc.) to facilitate selective distribution of power within the power domains.

In addition to the components (e.g., hardware resources 150, network module 160, management controller 152, power source 165, power manager 166, power rails 167-168, components making up channels 170-172 and sideband channels 174, etc.) additional hardware components (e.g., peripheral devices) (not shown in FIG. 1B) may be installed within (or externally to) the data processing system 140.

In embodiments, these peripheral devices may include channel cards (e.g., a fiber channel card, or the like), network interface cards (NICs), graphical processing units (GPU), data processing units (DPUs), digital signal processors (DSPs), or the like and may communicate with the existing components of the data processing system 140 via various interfaces (e.g., one or more Peripheral Component Interconnect Express (PCIe) buses, universal serial buses (USB), or the like).

These peripheral devices may also draw power from the power source 165 in order to provide their functions (e.g., may be powered entirely, or in part, by power supplied from the power source 165 of the data processing system 140). Each of these peripheral devices may have one or more power rating values (e.g., a minimum, average, optimal, maximum, or the like power rating value) (also referred to herein simply as "power rating") as defined by a manufacturer and/or provider of these peripheral devices. To perform their functionalities, these peripheral devices may also use the limited computing resources of any of the main processor of the data processing system 140 and/or the processor of management controller 152.

Turning to FIG. 1C, a diagram illustrating an example architecture between the main processor, management controller 152, and peripheral devices of the data processing system 140 is shown. As shown in FIG. 1C, the same data processing system 140 is now shown to include (for exemplary purposes only) just the main processor (e.g., in the form of startup manager 180 that includes the basic input/output system (BIOS) of the data processing system 140), management controller 152, and one or more peripheral devices 182A-182N.

Each of the peripheral devices 182A-182N may be an add-on and/or expansion component (namely, hardware component) such as channel cards (e.g., a fiber channel card, or the like), network interface cards (NICs), graphical processing units (GPU), data processing units (DPUs), digital signal processors (DSPs), or the like. Each of the peripheral devices 182A-182N may include its own processor (namely, a third processor separate from the main processor(s) of the data processing system 140 and the (second) processor(s) of the management controller 152).

As shown in FIG. 1C and discussed above in reference to FIG. 1B, the management controller 152 communicates (e.g., exchanges data) with the startup manager 180 via sideband channels 174. The startup manager 180 in turn is connected to and communicates (e.g., exchanges data) with the peripheral devices 182A-182N using communication bus(es) such as PCIe Bus 184. Other types of communication bus(es) besides PCIe Bus 184 may be used depending on the default communication interface(s) and/or connection interface(s) of the peripheral devices without departing from the scope of embodiments disclosed herein.

As further shown in FIG. 1C, the management controller 152 may be connected to and communicate (e.g., exchanges data) with the peripheral devices 182A-182N via sideband channels 174 that are different from the PCIe Bus 184 (and/or the other communication bus(es) connecting the startup manager 180 to the peripheral devices 182A-182N). Such sideband channels 174 may be configured using physical and/or virtual paths (e.g., connections) between the management controller 152 and the peripheral devices 182A-182N. For example, such sideband channels 174 may be composed of PCIe buses (or other appropriate communication bus(es)) separate from the ones that connect the startup manager to the peripheral devices 182A-182N.

For example, assume that there is only a single peripheral device 182A within the data processing system 140. Further assume that this single peripheral device 182A is connected to the startup manager 180 via a PCIe bus (i.e., a first PCIe bus). Even further assume that the management controller 152 is also connected to the single peripheral device via a PCIe bus (i.e., a second PCI bus). In this example, the first PCIe bus would be a completely separate and distinct component (e.g., hardware component) from the second PCIe bus. Said another way, in this example, there would be two separate PCIe buses that each respectively (and separately) connects the startup manager 180 and the management controller 152 to the single peripheral device 182A. More specifically, albeit the same type(s) of communication medium(s) being used, the startup manager 180 and the management controller 152 do not share the same communication medium(s) (e.g., the communication interface(s)) themselves and communication path(s) to communicate with the peripheral devices 182A-182N.

As a result, the management controller 152 may advantageously obtain (e.g., retrieve, receive, or the like) data from and issue commands (i.e., instructions) to the peripheral devices 182A-182N without ever having to bother (e.g., disrupt) the operations of the startup manager 180 (including the main processor of the data processing system 140).

Turning to FIG. 1D, a diagram illustrating an example of a management controller 152 of data processing system 140 in accordance with an embodiment is shown. As shown in FIG. 1D, the management controller 152 may include a storage 190 that stores a peripheral device map 192. Each of these components will be described as follows.

Storage 190 may be implemented using any type and combination of storage devices and/or memory (e.g., hard disk drive (HDD), solid state drive (SSD), random access memory (RAM), or the like). Storage 190 may be an independent storage of the management controller 152 (e.g., independent from the storage(s) of the data processing system 140 that are part of the hardware resources 150). Said another way, the storage(s) making up part of hardware resources 150 may be the main storage(s) of the data processing system 140 while storage 190 is a second storage that is independent and separate from the main storage(s).

The peripheral device map 192 may be a collection of data that may be organized within any type, size, and combination of data structures (e.g., lists, tables, files, or the like). The peripheral device map 192 may include, among other things: (i) configuration data of each of the peripheral devices (e.g., 182A-182N, FIG. 1C) of the data processing system; (ii) location information of each of the peripheral devices; and (iii) any other type of data associated with the peripheral devices including an identification (ID), a serial number, a model number, a name, other specification information (e.g., the capabilities and/or functionalities of the peripheral devices, or the like), or the like of each of the peripheral devices.

In embodiments, the location information in the peripheral device map 192 may include information (e.g., information about a physical and/or virtual port/interface, or the like) that can be used by the management controller 152 to: (i) identify a location of each of the peripheral devices within the data processing system; and (ii) determine how the management controller can (e.g., what communication medium to use to be able to) communicate with each of the peripheral devices.

The information contained in the peripheral device map 192 may advantageously be used by the management controller 152 to obtain (e.g., retrieve, receive, or the like) data from and issue commands (i.e., instructions) to the peripheral devices 182A-182N without ever having to bother (e.g., disrupt) the operations of the startup manager 180 (including the main processor of the data processing system 140). Other types of information not discussed above that would also achieve such results may also be included in the peripheral device map 192 without departing from the scope of embodiments disclosed herein.

Although not shown in FIG. 1C, management controller 152 may also include other components such as its own set of hardware components (e.g., the second processor, one or more second memories that are independent and separate from the main memor(ies) of the data processing system 140, or the like) and its own set of software components (e.g., a set of applications independent and separate from the applications running on the other components of the data processing system 140 of FIG. 1B).

Figure 2A:
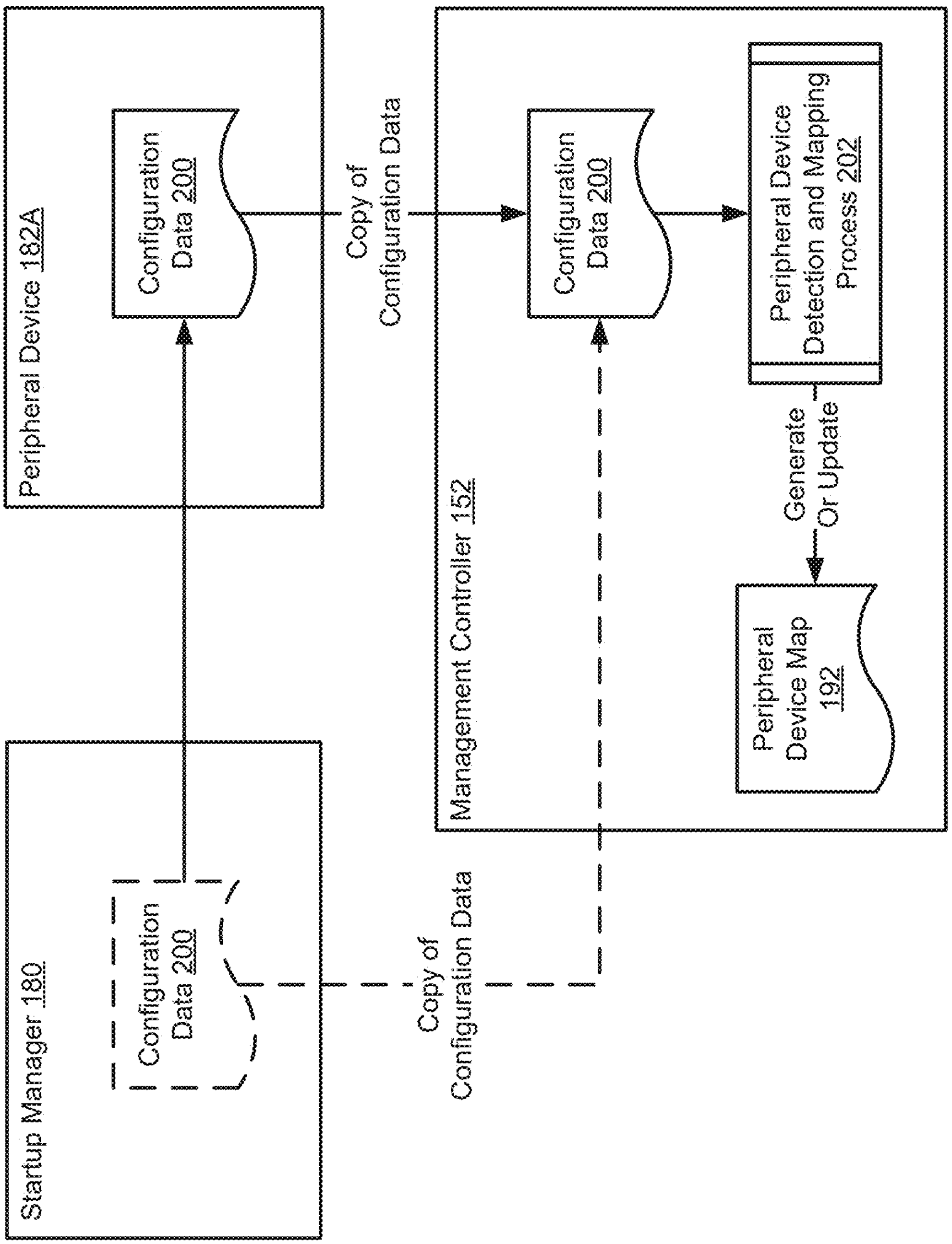
FIGS. 2A-2B show data flow diagrams in accordance with one or more embodiments.
Figure 2B:
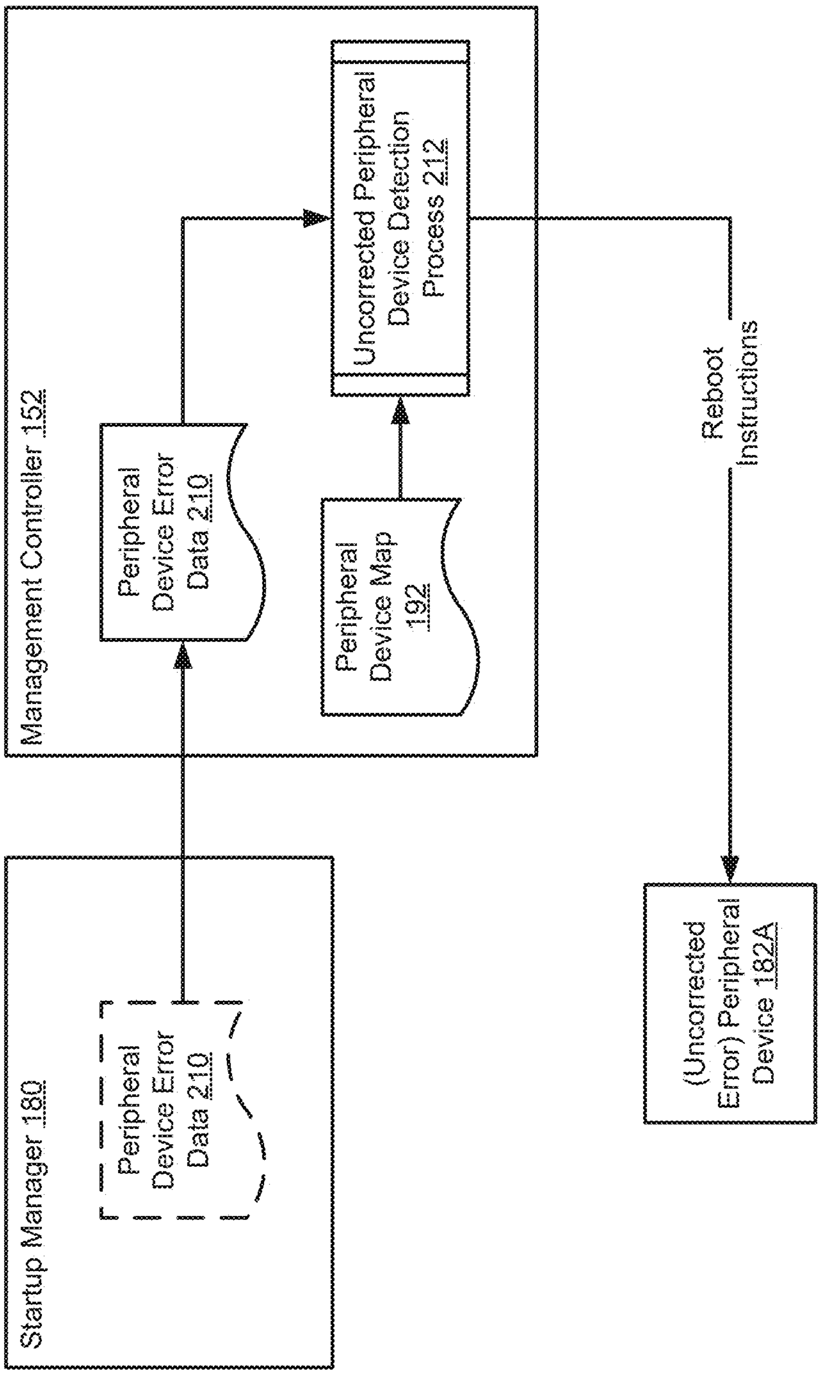

To further clarify embodiments disclosed herein, data flow diagrams in accordance with one or more embodiments disclosed herein is shown in FIGS. 2A-2B. In these diagrams, flows of data and processing of data are illustrated using different sets of shapes. A first set of shapes (e.g., 200, 192, 210, etc.) is used to represent data structures (e.g., files, data packets, or the like), a second set of shapes (e.g., 202, 212, etc.) is used to represent processes performed using and/or that generate data, and a third set of shapes (e.g., 180, 182A, 152, etc.) is used to represent the components (e.g., devices) that perform the processes shown using the second set of shapes.

Starting with FIG. 2A, a first data flow diagram illustrating an example peripheral device map (e.g., 192, FIG. 1D) generation and/or update process is shown. Although the data flow diagram in FIG. 2A will be described specifically with regard to a single peripheral device (e.g., 182A), one of ordinary skill would be appreciate that the process shown in FIG. 2A may be applied to any number (and/or type) of peripheral devices without departing from the scope of embodiments disclosed herein.

As shown in FIG. 2A, the startup manager 180 (e.g., the BIOS as embodied by the main processor of the data processing system 140), may generate configuration data 200 for peripheral device 182A.

The configuration data 200 may include any form and type of data (including, but not limited to, update data, initialization data, drivers, or the like) that would allow the data processing system 140 to use the peripheral device 182A. The configuration data 200 may be generated by the startup manager 180 during a boot up (e.g., a start up) of the data processing system 140 (e.g., upon the data processing system 140 being turned on, restarted, or the like). The configuration data 200 may be generated as part of the BIOS compiling and configuring information on all of the hardware (and/or software) components installed in (and/or externally connected to) the data processing system 140).

Once the configuration data 200 is generated, the startup manager 180 may transmit the configuration data 200 to the peripheral device 182A in order to configure the peripheral device 182A to be used by the data processing system 140. In turn, the peripheral device 182A may forward a copy of the configuration data 200 to the management controller 152 (e.g., via the sideband channel(s) connecting peripheral device 182A to management controller 152).

Alternatively, instead of the peripheral device 182A forwarding a copy of the configuration data 200 to the management controller 152, the management controller 152 may be configured to periodically (e.g., at predetermined intervals set by a user/administrator of the data processing system 140 or of the management controller 152) retrieve configuration data 200 that has been added to the peripheral device 182A. As another alternative, the startup manager 180 may directly transmit the copy of the configuration data 200 to the management controller 152.

Additionally, any combination of one or more of the alternatives that eventually results in the management controller obtaining (e.g., retrieving, receiving, or the like) the configuration data 200 may be used without departing from the scope of embodiments disclosed herein.

Upon obtaining the configuration data 200, the management controller may use the configuration data 200 to compile and/or update (e.g., via peripheral device detection and mapping process 202) a peripheral device map 192 (which was discussed above in reference to FIG. 1D. Any number and types of processes may be implemented, performed, and/or executed as part of peripheral device detection and mapping process 202 to transform (e.g., analyze, store, process, or the like) the configuration data into data to be stored in the peripheral device map 192 without departing from the scope of embodiments disclosed herein.

Once the peripheral device map 192 is created and/or updated to include information from all configuration data (e.g., all instances of the configuration data 200 obtained by the management controller 152) of the peripheral devices of the data processing system, the management controller 152 may be provided with a detailed view and understanding of all of these peripheral devices. As a result, whenever the management controller 152 needs to interact with any of the peripheral devices, the management controller 152 may advantageously do so without having to bother (e.g., disrupt) the main processor of the data processing system 140.

Turning now to FIG. 2B, a second data flow diagram illustrating an example peripheral device management and recovery process is shown. The startup manager 180, management controller 152, peripheral device map 192, and peripheral device 182A shown in FIG. 2B are the same as the ones discussed above in reference to FIGS. 1A-2A.

As shown in FIG. 2B, the startup manager 180 may generate peripheral device error data 210. The peripheral device error data 210 (also referred to herein as "system error data") may be generated when the data processing system 140 is experiencing one or more errors and may include any number and type of information that describe the error(s). In embodiments, the peripheral device error data 210 may be generated by the startup manager 180 during a system management interrupt (SMI) event experienced by the main processor of the data processing system.

Additionally, although the peripheral device error data 210 contains (in its name) the term "peripheral device", the errors being experienced by the data processing system (that are also recorded in the peripheral device error data 210) may not necessarily have to be errors caused or is being experienced by any peripheral devices. Said another way, any components of the data processing system discussed above in reference to FIGS. 1B and 1C may be the cause (e.g., root) of the error(s).

One the peripheral device error data 210 is generated, the startup manager 180 may provide the peripheral device error data 210 to the management controller 152. Upon receiving the peripheral device error data 210, the management controller may initiate (e.g., instantiate, start performance of, or the like) uncorrected peripheral device detection process 212.

As part of uncorrected peripheral device detection process 212, the management controller 152 may perform one or more processes to determine (using the peripheral device error data 210) whether any of the peripheral devices (e.g., 182A-182N, FIG. 1C) of the data processing system 140 (or the data processing system 140 itself) is experiencing an uncorrected error.

In embodiments, an uncorrected error may be an error (or multiple errors) being experienced by a peripheral device (or by the data processing system itself as a result of one or more operations of the peripheral device) that cannot be resolved without at least having to restart and/or reboot the peripheral device. For example, simply closing one or more applications associated with (or using the peripheral device) or terminating one or more operations executing on the peripheral device will not resolve the error(s) being experienced by the peripheral device (and/or the data processing system as a whole). Conversely, any error(s) that can be resolved without having to, at least, restart and/or reboot a peripheral device may be a corrected error.

Any number and type of processes, analyses, and/or techniques that can be used to identify such uncorrected error(s) may be performed by the management controller 152 without departing from the scope of one or more embodiments disclosed herein.

Additionally, as part of the uncorrected peripheral device detection process 212, the management controller 152 may also log (e.g., store) information regarding the error(s) recorded in the peripheral device error data 210. The information regarding the error(s) may be logged by the information being stored in the storage 190 (e.g., FIG. 1D) of the management controller 152. The information regarding the error(s) may also (or as an alternative) be logged by being transmitted (e.g., by the management controller 152) to the data processing system manager (e.g., 110, FIG. 1A) to be processed and stored in the data processing system manager.

Once an uncorrected error is identified, the management controller 152 may (also as part of uncorrected peripheral device detection process 212), determine which peripheral devices are associated with (e.g., may potentially or is the cause of) the uncorrected error. This determination by the management controller 152 may be done using the information (e.g., configuration information or the like) of the peripheral devices included in the peripheral device map 192. The peripheral device map 192 may also be used by the management controller 152 to identify the location(s) of these peripheral devices that are associated with the uncorrected error.

Any number and type of processes, analyses, and/or techniques that is able to accurately link the uncorrected error to one or more of the peripheral devices may be performed by the management controller 152 without departing from the scope of one or more embodiments disclosed herein.

As shown in the example of FIG. 2B, the management controller 152 has identified (via uncorrected peripheral device detection process 212) that peripheral device 182A is associated with the uncorrected error. As a result of this determination, the management controller 152 may send reboot (and/or restart) instructions to the peripheral device 182A to cause the peripheral device 182A to reboot and/or restart itself (in hopes of resolving the uncorrected error such that the data processing system may use the peripheral device 182A again without any issues once the peripheral device 182A has completed the reboot and/or restart process).

In embodiments, only the peripheral devices determined to be associated with the uncorrected error(s) will be rebooted and/or restarted. The data processing system 140 itself (namely, the main processor of the data processing system 140) will not be restarted. As such, other processes that are being executed by the main processor of the data processing system 140 that are unaffected by the uncorrected error may advantageously continue to run without any disruptions (e.g., without any down time of these processes).

In embodiments, if the uncorrected error(s) continue to persist (e.g., continues to exist, cannot be resolved, or the like) after the peripheral device(s) associated with the uncorrected error(s) are individually rebooted (and/or restarted) without rebooting and/or restarting the entire data processing system 140, then the data processing system 140 itself may be instructed by the management controller 152 to be rebooted and/or restarted. This action may also be taken if the identified peripheral device(s) cannot (regardless of the reason why) be rebooted and/or restarted by the management controller 152. Alternatively, the management controller 152 may report such events to the data processing system manager 110 where other processes (e.g., a hardware component replacement notice, data processing system restart and/or reboot instructions, or the like) may be issued to the data processing system 140 by the data processing system manager 110.

Any of the processes illustrated using the second set of shapes (shown in FIGS. 2A-2B) may be performed, in part or whole, by digital processors (e.g., central processors, processor cores, etc.) that execute corresponding instructions (e.g., computer code/software). Execution of the instructions may cause the digital processors to initiate performance of the processes. Any portions of the processes may be performed by the digital processors and/or other devices. For example, executing the instructions may cause the digital processors to perform actions that directly contribute to performance of the processes, and/or indirectly contribute to performance of the processes by causing (e.g., initiating) other hardware components to perform actions that directly contribute to the performance of the processes.

Any of the processes illustrated using the second set of shapes may be performed, in part or whole, by special purpose hardware components such as digital signal processors, application specific integrated circuits, programmable gate arrays, graphics processing units, data processing units, and/or other types of hardware components. These special purpose hardware components may include circuitry and/or semiconductor devices adapted to perform the processes. For example, any of the special purpose hardware components may be implemented using complementary metal-oxide semiconductor-based devices (e.g., computer chips).

Figure 3A:
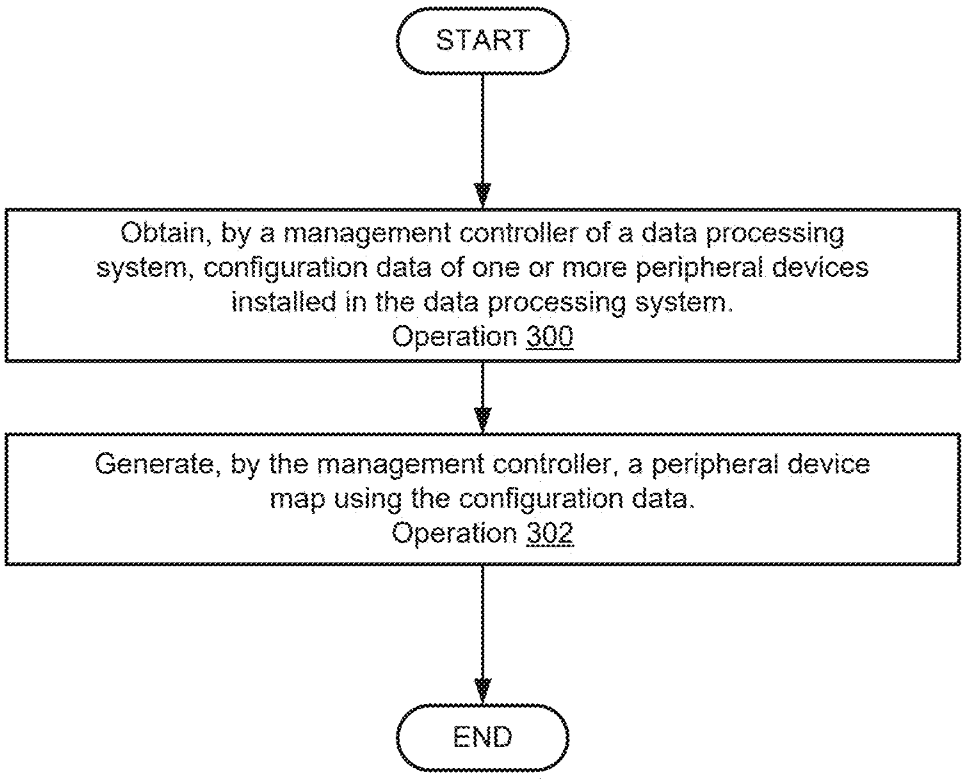
FIGS. 3A-3B show flowcharts in accordance with one or more embodiments.
Figure 3B:
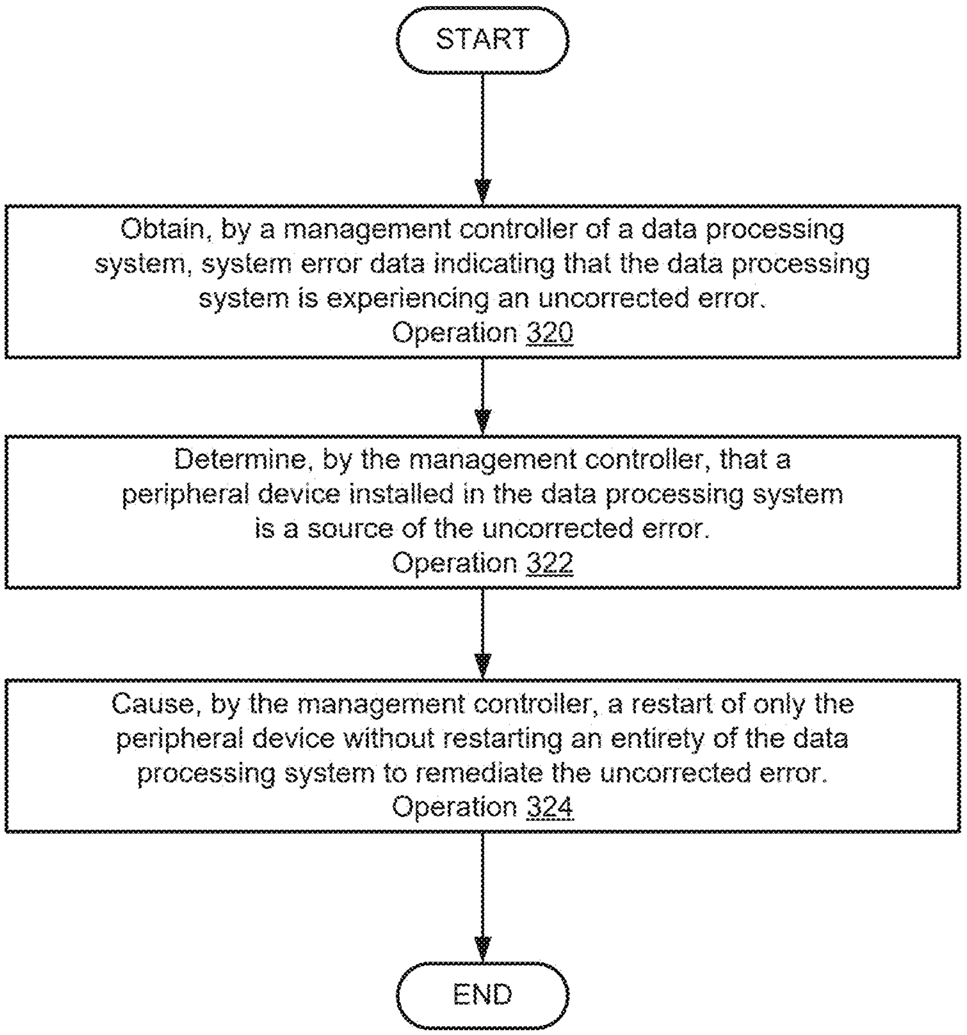

As discussed above, the components of FIGS. 1A-1D may perform various methods for managing a data processing system. FIGS. 3A-3B illustrate examples of methods that may be performed by the components of FIGS. 1A-1D. For example, any of the data processing systems 102A-102N, and/or the data processing system manager 110, shown in FIG. 1A may perform all or a portion of the methods. In the diagrams discussed below and shown in FIGS. 3A-3B, any of the operations may be repeated, performed in different orders, and/or performed in parallel with or in a partially overlapping in time manner with other operations.

Starting with FIG. 3A, in Operation 300 and as discussed above in reference to FIG. 2A, a management controller of a data processing system may obtain configuration data of one or more peripheral devices of the data processing system.

In Operation 302, as discussed above in reference to FIG. 2A (namely, as part of the details of peripheral device detection and mapping process 202 of FIG. 2A), the management controller may generate (and/or update) a peripheral device map using the configuration data obtained in Operation 300.

The method of FIG. 3A may end following Operation 302.

Turning now to FIG. 3B, in Operation 320 and as discussed above in reference to FIG. 2B, a management controller of a data processing system may obtain system error data indicating that the data processing system is (and/or one or more peripheral devices of the data processing system are) experiencing an uncorrected error.

In Operation 322, as discussed above in reference to FIG. 2B (namely, as part of the details of the uncorrected peripheral device detection process 212 of FIG. 2B), the management controller may determine that a peripheral device (or multiple peripheral devices) of the data processing system is a source (e.g., root) of the uncorrected error.

In Operation 324, as discussed above in reference to FIG. 2B, the management controller may cause a restart of only the identified peripheral device (or peripheral devices) without restarting an entirety of the data processing system to remediate (e.g., resolve) the uncorrected error.

The method of FIG. 3B may end following Operation 324.

Any of the components illustrated in FIGS. 1A-3B may be implemented with one or more computing devices. Turning to FIG. 4, a block diagram illustrating an example of a computing device (also referred to herein as "system 400") in accordance with an embodiment is shown. For example, system 400 may represent any of data processing systems described above performing any of the processes or methods described above. System 400 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system. Note also that system 400 is intended to show a high-level view of many components of the computer system. However, it is to be understood that additional components may be present in certain implementations and furthermore, different arrangement of the components shown may occur in other implementations. System 400 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 400 includes processor 401, memory 403, and devices 405-407 via a bus or an interconnect 410. Processor 401 may represent a single processor or multiple processors with a single processor core or multiple processor cores included therein. Processor 401 may represent one or more general-purpose processors such as a microprocessor, a central processing unit (CPU), or the like. More particularly, processor 401 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 401 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 401, which may be a low power multi-core processor socket such as an ultra-low voltage processor, may act as a main processing unit and central hub for communication with the various components of the system. Such processor can be implemented as a system on chip (SoC). Processor 401 is configured to execute instructions for performing the operations discussed herein. System 400 may further include a graphics interface that communicates with optional graphics subsystem 404, which may include a display controller, a graphics processor, and/or a display device.

Processor 401 may communicate with memory 403, which in one embodiment can be implemented via multiple memory devices to provide for a given amount of system memory. Memory 403 may include one or more volatile storage (or memory) devices such as random access memory (RAM), dynamic RAM (DRAM), synchronous DRAM (SDRAM), static RAM (SRAM), or other types of storage devices. Memory 403 may store information including sequences of instructions that are executed by processor 401, or any other device. For example, executable code and/or data of a variety of operating systems, device drivers, firmware (e.g., input output basic system or BIOS), and/or applications can be loaded in memory 403 and executed by processor 401. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

System 400 may further include IO devices such as devices (e.g., 405, 406, 407, 408) including network interface device(s) 405, optional input device(s) 406, and other optional IO device(s) 407. Network interface device(s) 405 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 406 may include a mouse, a touch pad, a touch sensitive screen (which may be integrated with a display device of optional graphics subsystem 404), a pointer device such as a stylus, and/or a keyboard (e.g., physical keyboard or a virtual keyboard displayed as part of a touch sensitive screen). For example, input device(s) 406 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 407 may include an audio device. An audio device may include a speaker and/or a microphone to facilitate voice-enabled functions, such as voice recognition, voice replication, digital recording, and/or telephony functions. Other IO devices 407 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. IO device(s) 407 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 410 via a sensor hub (not shown), while other devices such as a keyboard or thermal sensor may be controlled by an embedded controller (not shown), dependent upon the specific configuration or design of system 400.

To provide for persistent storage of information such as data, applications, one or more operating systems and so forth, a mass storage (not shown) may also couple to processor 401. In various embodiments, to enable a thinner and lighter system design as well as to improve system responsiveness, this mass storage may be implemented via a solid state device (SSD). However, in other embodiments, the mass storage may primarily be implemented using a hard disk drive (HDD) with a smaller amount of SSD storage to act as an SSD cache to enable non-volatile storage of context state and other such information during power down events so that a fast power up can occur on re-initiation of system activities. Also a flash device may be coupled to processor 401, e.g., via a serial peripheral interface (SPI). This flash device may provide for non-volatile storage of system software, including a basic input/output software (BIOS) as well as other firmware of the system.

Storage device 408 may include computer-readable storage medium 409 (also known as a machine-readable storage medium or a computer-readable medium) on which is stored one or more sets of instructions or software (e.g., processing module, unit, and/or processing module/unit/logic 428) embodying any one or more of the methodologies or functions described herein. Processing module/unit/logic 428 may represent any of the components described above. Processing module/unit/logic 428 may also reside, completely or at least partially, within memory 403 and/or within processor 401 during execution thereof by system 400, memory 403 and processor 401 also constituting machine-accessible storage media. Processing module/unit/logic 428 may further be transmitted or received over a network via network interface device(s) 405.

Computer-readable storage medium 409 may also be used to store some software functionalities described above persistently. While computer-readable storage medium 409 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of embodiments disclosed herein. The term "computer-readable storage medium" shall accordingly be taken to include, but not be limited to, solid-state memories, and optical and magnetic media, or any other non-transitory machine-readable medium.

Processing module/unit/logic 428, components and other features described herein can be implemented as discrete hardware components or integrated in the functionality of hardware components such as ASICS, FPGAs, DSPs or similar devices. In addition, processing module/unit/logic 428 can be implemented as firmware or functional circuitry within hardware devices. Further, processing module/unit/logic 428 can be implemented in any combination hardware devices and software components.

Note that while system 400 is illustrated with various components of a data processing system, it is not intended to represent any particular architecture or manner of interconnecting the components; as such details are not germane to embodiments disclosed herein. It will also be appreciated that network computers, handheld computers, mobile phones, servers, and/or other data processing systems which have fewer components or perhaps more components may also be used with embodiments disclosed herein.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments disclosed herein also relate to an apparatus for performing the operations herein. Such a computer program is stored in a non-transitory computer readable medium. A non-transitory machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments disclosed herein are not described with reference to any particular programming language. It will be appreciated that a variety of programming languages may be used to implement the teachings of embodiments disclosed herein.

In the foregoing specification, embodiments have been described with reference to specific exemplary embodiments thereof. It will be evident that various modifications may be made thereto without departing from the broader spirit and scope of the embodiments disclosed herein as set forth in the following claims. The specification and drawings are, accordingly, to be regarded in an illustrative sense rather than a restrictive sense.

What is claimed is:

1. A method for managing a data processing system, the method comprising:

obtaining, by a management controller of the data processing system, system error data indicating that the data processing system is experiencing an uncorrected error, the management controller being separate and operates independently from an operating system (OS) of the data processing system, and the data processing system further comprises a single network module that is shared by both of the management controller and hardware resources of the data processing system and that separately communicates with the management controller and the hardware resources using out-of-band channels for the management controller and in-band channels for the hardware resources such that communications received by the single network module and meant for the management controller never flow through the hardware resources first before reaching the management controller;

determining, by the management controller, that a peripheral device installed in the data processing system is a source of the uncorrected error, the determination being made using the system error data and a peripheral device map stored in the management controller; and causing, by the management controller, a restart of only the peripheral device without restarting an entirety of the data processing system to remediate the uncorrected error.

2. The method of claim 1, wherein the management controller is a microcontroller installed within the data processing system that operates independently of a central processing unit (CPU) of the data processing system, the CPU hosting the OS, and the peripheral device is a data processing unit (DPU).

3. The method of claim 2, wherein the peripheral device is a first peripheral device among a plurality of peripheral devices installed in the data processing system, and the plurality of peripheral devices are connected to the CPU via a first communication interface and to the management controller via a second communication interface different from the first communication interface.

4. The method of claim 3, wherein the system error data is generated by the CPU of the data processing system during a system management interrupt (SMI) event, and the uncorrected error is an error that cannot be resolved without, at least, restarting the peripheral device for recovery.

5. The method of claim 3, wherein the first communication interface is a Peripheral Component Interconnect Express (PCIe) bus, and the second communication interface comprises one or more sideband channels between the management controller and the plurality of peripheral devices.

6. The method of claim 3, further comprising:

obtaining, by the management controller, configuration data of the plurality of peripheral devices from a startup manager of the data processing system; and generating, by the management controller, the peripheral device map using the configuration data.

7. The method of claim 6, wherein the startup manager is a Basic Input/Output System (BIOS) of the data processing system.

8. A non-transitory machine-readable medium having instructions stored therein, which when executed by a processor, cause the processor to perform operations for managing a data processing system, the operations comprising:

obtaining, by a management controller of the data processing system, system error data indicating that the data processing system is experiencing an uncorrected error, the management controller being separate and operates independently from an operating system (OS) of the data processing system, and the data processing system further comprises a single network module that is shared by both of the management controller and hardware resources of the data processing system and that separately communicates with the management controller and the hardware resources using out-of-band channels for the management controller and in-band channels for the hardware resources such that communications received by the single network module and meant for the management controller never flow through the hardware resources first before reaching the management controller;

determining, by the management controller, that a peripheral device installed in the data processing system is a source of the uncorrected error, the determination being made using the system error data and a peripheral device map stored in the management controller; and causing, by the management controller, a restart of only the peripheral device without restarting an entirety of the data processing system to remediate the uncorrected error.

9. The non-transitory machine-readable medium of claim 8, wherein the management controller is a microcontroller installed within the data processing system that operates independently of a central processing unit (CPU) of the data processing system, the CPU hosting the OS, and the peripheral device is a data processing unit (DPU).

10. The non-transitory machine-readable medium of claim 9, wherein the peripheral device is a first peripheral device among a plurality of peripheral devices installed in the data processing system, and the plurality of peripheral devices are connected to the CPU via a first communication interface and to the management controller via a second communication interface different from the first communication interface.

11. The non-transitory machine-readable medium of claim 10, wherein the system error data is generated by the CPU of the data processing system during a system management interrupt (SMI) event, and the uncorrected error is an error that cannot be resolved without, at least, restarting the peripheral device for recovery.

12. The non-transitory machine-readable medium of claim 10, wherein the first communication interface is a Peripheral Component Interconnect Express (PCIe) bus, and the second communication interface comprises one or more sideband channels between the management controller and the plurality of peripheral devices.

13. The non-transitory machine-readable medium of claim 10, wherein the operations further comprise:
obtaining, by the management controller, configuration data of the plurality of peripheral devices from a startup manager of the data processing system; and
generating, by the management controller, the peripheral device map using the configuration data.

14. The non-transitory machine-readable medium of claim 13, wherein the startup manager is a Basic Input/Output System (BIOS) of the data processing system.

15. A data processing system, comprising:
a management controller adapted to perform operations for managing the data processing system, the operations comprising:
obtaining system error data indicating that the data processing system is experiencing an uncorrected error, the management controller being separate and operates independently from an operating system (OS) of the data processing system;
determining that a peripheral device installed in the data processing system is a source of the uncorrected error, the determination being made using the system error data and a peripheral device map stored in the management controller; and
causing a restart of only the peripheral device without restarting an entirety of the data processing system to remediate the uncorrected error; and
a single network module that:
is shared by both of the management controller and hardware resources of the data processing system, and
separately communicates with the management controller and the hardware resources using out-of-band channels for the management controller and in-band channels for the hardware resources such that communications received by the single network module and meant for the management controller never flow through the hardware resources first before reaching the management controller.

16. The data processing system of claim 15, wherein the management controller is a microcontroller installed within the data processing system that operates independently of a central processing unit (CPU) of the data processing system, the CPU hosting the OS, and the peripheral device is a data processing unit (DPU).

17. The data processing system of claim 16, wherein the peripheral device is a first peripheral device among a plurality of peripheral devices installed in the data processing system, and the plurality of peripheral devices are connected to the CPU via a first communication interface and to the management controller via a second communication interface different from the first communication interface.

18. The data processing system of claim 17, wherein the system error data is generated by the CPU of the data processing system during a system management interrupt (SMI) event, and the uncorrected error is an error that cannot be resolved without, at least, restarting the peripheral device for recovery.

19. The data processing system of claim 17, wherein the first communication interface is a Peripheral Component Interconnect Express (PCIe) bus, and the second communication interface comprises one or more sideband channels between the management controller and the plurality of peripheral devices.

20. The data processing system of claim 17, wherein the operations further comprise:
obtaining configuration data of the plurality of peripheral devices from a startup manager of the data processing system, the startup manager being a Basic Input/Output System (BIOS) of the data processing system; and
generating the peripheral device map using the configuration data.

* * * * *